United States Patent Office 3,289,505
Patented Dec. 6, 1966

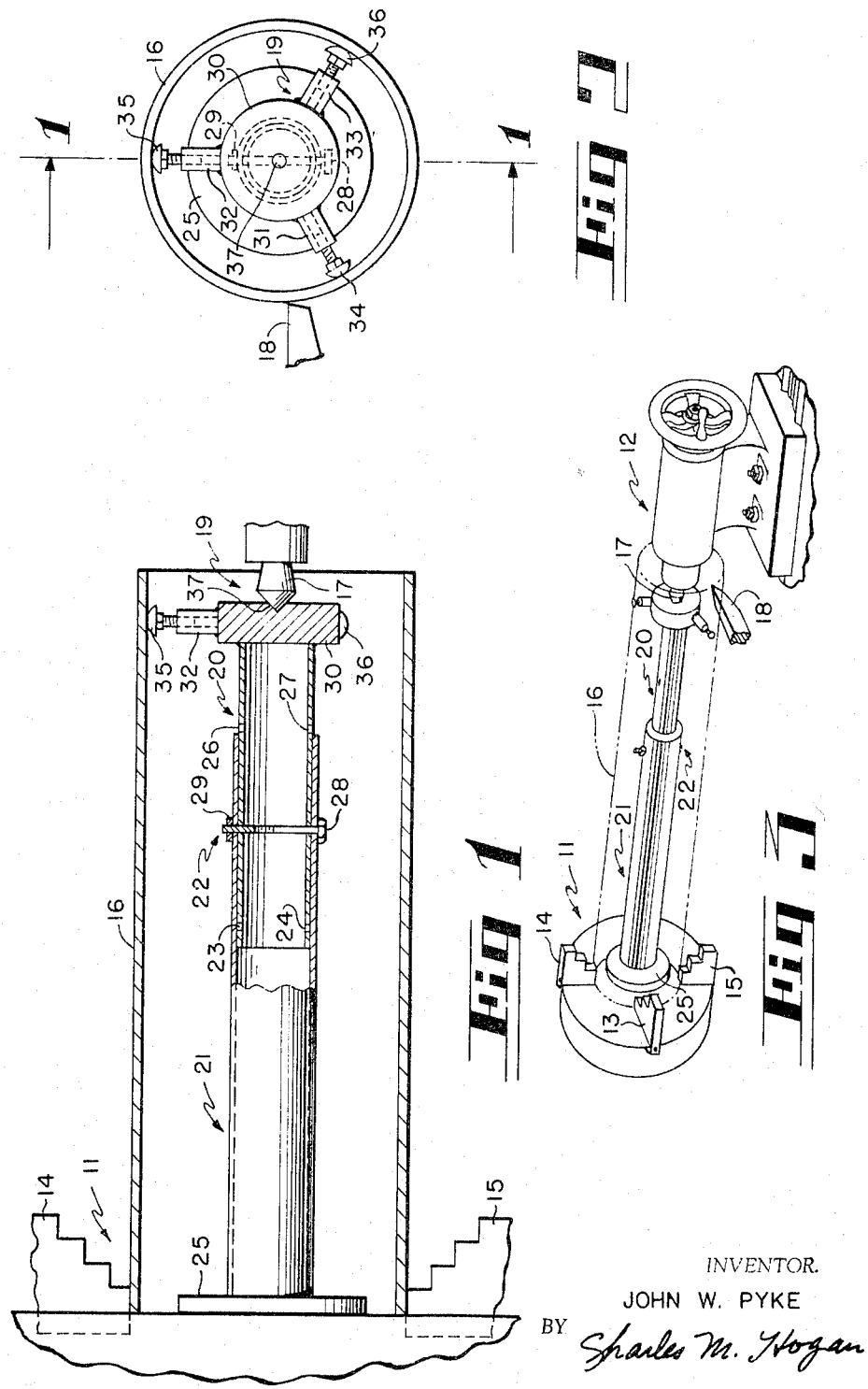

3,289,505
ADJUSTABLE CENTERING FIXTURE FOR USE IN MACHINING LONG TUBULAR WORK PIECES
John W. Pyke, 898 Montrose Ave., Bexley, Ohio
Filed June 9, 1965, Ser. No. 462,601
4 Claims. (Cl. 82—45)

The present invention relates generally to accessories for use in the machining of work pieces which standard turret lathes and the like are not made to accommodate, and, more specifically, the invention provides an adjustable centering fixture for long-axis tubular work pieces.

The machining of long tubular work pieces or work pieces which are so formed as not to lend themselves to positioning by the live center of the tail stock of a lathe presents numerous difficulties. As an example, if the work piece has a fitting or projection on its side or is characterized by one or more substantial external protuberances at points between the chuck and the tail stock, the use of a standard steady rest or like accessory to provide a lower bearing and supporting surface for the work piece is precluded. As another example, a work piece which is tubular and open at the end adjacent the tail stock cannot be grasped by the live center of the tail stock. Additionally, any long-axis work piece presents a substantial problem as to how to keep it on center and to maintain precision of machining and freedom from vibration while the machining operation is being performed.

A primary object of the invention is to provide an accessory or fixture which readily and conveniently solves these problems, which is adaptable to being used with work pieces of various lengths and inner-diameters and which is convenient to install, adjust and use.

For a better understanding of the invention, together with other and further objects, advantages and capabilities thereof, reference is made to the following description of the accompanying drawings, in which:

FIG. 1 is an axial sectional view through an adjustable centering fixture in accordance with the present invention, showing immediately associated turret lathe parts and a work piece, all as taken along section line 1—1 of FIG. 2;

FIG. 2 is an end view of the FIG. 1 centering fixture and work piece; and

FIG. 3 is a perspective view taken approximately from a work position point of view, showing the relationships among the chuck, tail stock, work piece and the centering fixture provided by the invention.

Referring now to the drawings, the reference numeral 11 designates a conventional adjustable chuck and the reference numeral 12 designates the tail stock, both parts of a conventional lathe, a turret lathe, for example. It will be understood that the chuck comprises conventional stepped centering bars 13, 14 and 15, which are simultaneously and symmetrically moved radially inwardly or outwardly, as desired, to grasp the left end of a work piece, such as the long-axis open ended tubular work piece 16 shown. The reference numeral 17 designates the live center customarily incorporated in the tail stock 12.

A brief consideration of the work piece 16 will indicate that its machining, as by a tool 18, involves numerous difficulties. First, the work piece is long and could not practically be centered by the chuck alone in cantilever-like fashion, particularly against the force of tool 18. Second, the right end of the work piece is open and there is nothing for the center piece 17 to grasp. Third, the aforementioned difficulties are compounded when it is realized that the lathe may be called upon for the machining of tubular work pieces fo various lengths and various inner diameters. The invention provides a fixture which enables a work piece to be accurately positioned and centered and which solves the aforementioned problem, while not being subject to the disadvantages and limitations of the conventional steady rest accessory or device.

The preferred embodiment of the invention herein shown comprises the following principal elements: First, a spider 19; second, a pair of telescoping pipe members 20 and 21; third, locking means 22; and fourth, a pedestal 25.

It will be understood that the chuck is appropriately bored and centered in accordance with conventional practice and that the chuck is set up firmly to grasp the long-axis tubular work piece 16 in the manner shown.

The pedestal 25 comprises a solid cylindrical metallic base member suitably welded to the tubular pipe member 21, the main axis of which is aligned with the center of the pedestal 25, to which it is secured. Closely slidably fitting into and in telescopic relationship with the pipe member 21 is an adjustably axially positioned tubular pipe member 20. The pipe member 20 is formed with a plurality of pairs of transverse apertures 23, 24, and 26, 27, for example, each pair being displaced axially from the next adjoining pair. A locking means 22, comprising a bolt 28 and nut 29, is shown in position projecting through a pair of these apertures and also through a single registering pair of apertures formed in the outer pipe member 21, the nut 29 being turned down securely to determine the effective length of the new centering device provided in accordance with the invention. Adjustment for different work pieces is provided by the selection of a pair of apertures such as 23, 24 and 26, 27 for traversal by the bolt 28.

The inner pipe member is secured at one end to the cap element 30 of the spider 19, which cap element is cylindrical in contour and bears a plurality of angularly symmetrically spaced internally threaded bosses 31, 32 and 33. The threads of the bosses receive standard head threaded adjusting screws 34, 35 and 36.

These adjusting screws are set to determine the effective outer diameter of the centering fixture, which is sufficiently less than the inner diameter of the work piece to permit the fixture to be positioned within the work piece, the adjusting screws 34, 35 and 36 then abutting against the interior surface of the work piece in snug fashion. The cap element of the spider is formed at 37 with a concavity complementary to and adapted to fit the conical tip of the conventional live center 17.

The parts 25 and 21 are made of metal and preferably welded together. The parts 20 and 30 are likewise made of metal and preferably welded together. Preferably the elements 30, 31, 32 and 33 of the spider 19 are formed from a single casting. It will be understood that it is within the scope of the invention to secure the various subassemblies together or to form rigidly secured subassemblies integrally, as described.

In the specific embodiment herein shown the central axes of the bosses 31, 32 and 33 are displaced by 120 degrees but it will be understood that a lesser displacement and a larger number of bosses are within the teachings of the invention.

In using the fixture in accordance with the invention, the work piece 16 is first set in place in chuck 11, as indicated. Then the locking device is removed and the appropriate pair of apertures selected. Next the locking device is put in place and nut 29 turned down. The adjusting screws 34, 35 and 36 are set in accordance with the inner diameter of the work piece, the entire fixture is put in place as shown in FIG. 1, and its central axis is aligned with the live center 17 and finally the live center is axially positioned firmly to secure the fixture and the work piece in place. It will be understood that the chuck is rotated at conventional machining speeds, whereupon the tool 18 exercises cutting force against the external surface of the work piece. Nothwithstanding the lateral nature of this force, the fixture maintains the work piece accurately centered throughout the machining operation.

While there has been shown and described what is at present considered to be the preferred embodiment of the invention, it will be understood by those skilled in the art that various changes and modifications may be made therein without departing from the scope of the invention as defined by the appended claims.

I claim:

1. A centering fixture for positioning a tubular work piece in a lathe comprising the combination of a pair of telescoping members, one adapted to bear against a chuck and the other adapted to extend toward a live center, means for adjustably but fixedly determining the extent of the telescoping of the two members and their net over-all length, the two members being adapted to be positioned within and in concentric relation to said work piece, and a spider member secured to said other telescoping member and formed to be aligned with the live center and to maintain the outer end of said work piece in concentric relation to said live center.

2. A centering fixture for positioning a tubular work piece in a lathe of the type having a chuck and a live center comprising: the combination of a pedestal adapted to be positioned in the chuck in concentric relation to the work piece, an outer pipe member extending axially of the pedestal, an inner pipe member extending axially outwardly from the outer pipe member, and a spider member having a concavity complementary to said live center and secured to the inner pipe member and formed with a plurality of symmetrically arranged outwardly radially extending bosses, adjusting screws fitted in said bosses and adapted to snugly abut against the inner surface of the work piece to maintain the outer end of the work piece in concentric relation to said live center, one of said pipe members being formed with a pair of aligned apertures and the other pipe member being formed with axially displaced pairs of aligned apertures, and locking means adapted to project through selected pairs of said apertures to determine the over-all length of the fixture.

3. A centering fixture for positioning a hollow work piece in a lathe of the type which includes a chuck and a live center comprising, in combination: means comprising a pair of telescoping members adapted to be disposed concentrically within and axially of the work piece and forming an extended pipe positioned in alignment between said chuck and said live center means for locking said members in any one of a plurality of axially relative positions, and means extended transversely of said pipe for maintaining the centrality of said pipe with respect to the work piece.

4. A centering fixture in accordance with claim 3 in which the transversely extending means comprises a spider member having a plurality of radially extending bosses symmetrically arranged and formed at their outer ends with adjusting screws.

References Cited by the Examiner

UNITED STATES PATENTS 137,298 4/1873 Ferrin _____ 82—40
2,809,044 10/1957 Landreth _____ 82—45 X WILLIAM W. DYER, JR., *Primary Examiner.*

LEONIDAS VLACHOS, *Examiner.*